United States Patent Office 3,473,378
Patented Oct. 21, 1969

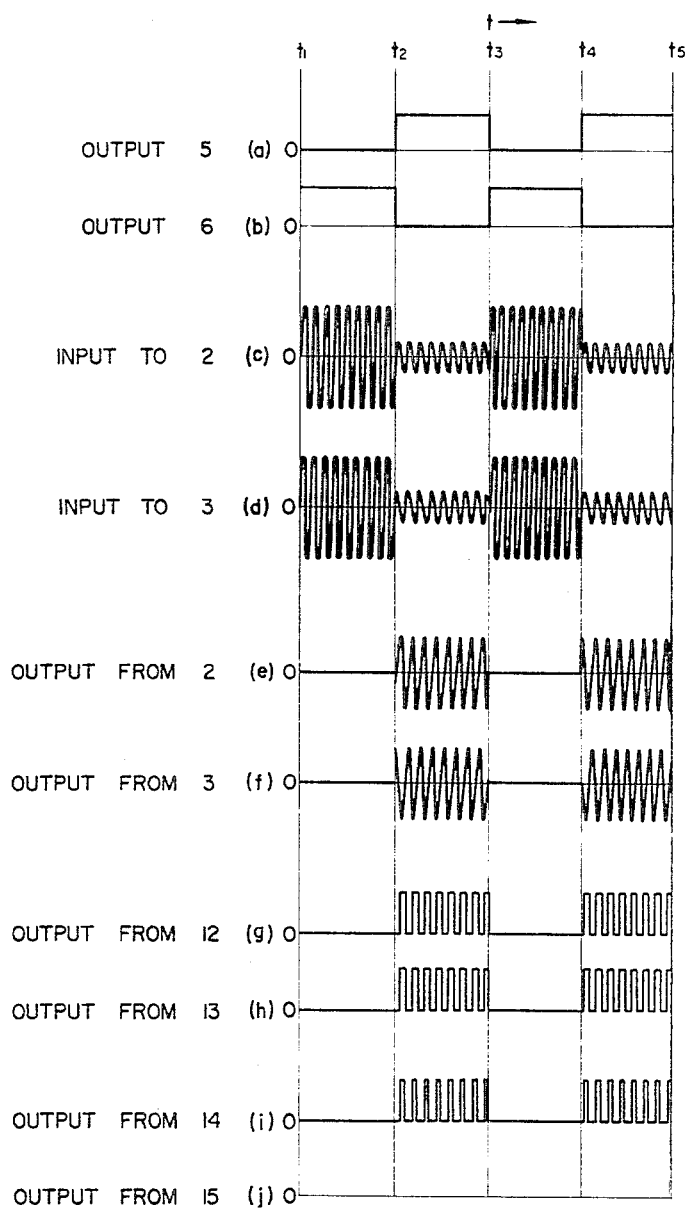

3,473,378
ULTRASONIC FLOWMETER SYSTEM
Yuji Yoshiyama and Takayoshi Ezawa, Amagasaki, Japan, assignors to Mitsubishi Denki Kabushiki Kaisha, Tokyo, Japan
Filed Dec. 29, 1966, Ser. No. 605,911
Claims priority, application Japan, Jan. 10, 1966, 41/1,198
Int. Cl. G01f 1/02
U.S. Cl. 73—194                                5 Claims

ABSTRACT OF THE DISCLOSURE

A system for measuring flow of fluid comprising two identical electro-acoustical transducers each sonically coupled to the fluid and disposed at opposite ends of a sonic path of fixed length within the fluid obliquely intersecting the flow of fluid. Propagation means including the transducers and a generator periodically propagate signals of ultrasonic frequency along the sonic path from each transducer to the other transducer simultaneously for periods in dependence upon the length of the sonic path. The sonic signals are converted to electrical signals which are amplified in amplifiers and then converted to trains of rectangular pulses the phase difference of which is measured to provide a measure of the speed of the flow of fluid. The generator maintains the amplifiers unable during the energization of both transducers.

---

This invention relates to an ultrasonic flowmeter system for measuring a speed of flowing fluid.

An object of the invention is to provide a new and improved ultrasonic flowmeter system having a high degree of accuracy and a quick response time and less affected by any variation in temperature of a fluid to be measured.

With the above object in view, the invention resides in an ultrasonic flowmeter system for measuring a speed of a fluid flowing through duct means, comprising first and second transducer elements operatively coupled to said duct means and sonically coupled to the fluid, oscillator means for producing a high frequency energy, synchronizing pulse generator means for controlling the operation of said high frequency oscillator means to permit the latter to produce and simultaneously apply said high frequency energy across both said first and second transducers for a predetermined period of time at predetermined intervals of time, each of said transducer elements being operative to convert said high frequency energy to an ultrasonic energy and transmit its beam toward the other transducer element through the fluid flowing through said duct means when said oscillator means are in its operative state and operative to receive the beam of ultrasonic wave transmitted by the other transducer element and convert it to an electrical energy when said oscillator means are in its inoperative state, first and second Schmitt circuit means operatively coupled to said first and second transducer means to shape the electrical energies converted by said first and second transducer elements to the respective rectangular waveforms, and phase comparison circuit means electrically connected to said first and second Schmitt circuit means to detect a phase difference between said rectangular waveforms, said phase difference providing a measure of a speed at which the fluid flows through the duct means.

This invention as to its organization and its mode of operation as well as other objects and advantages thereof will become more readily apparent from the following detailed description taken in conjunction with the accompanying drawings in which.

Figure 1:
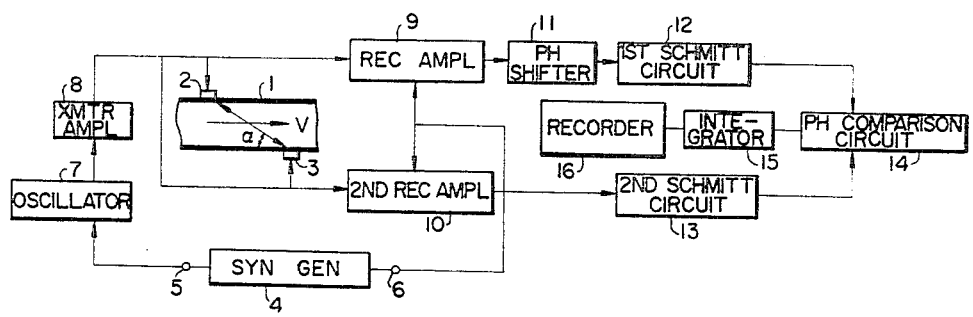
FIGURE 1 is a block diagram of one embodiment constructed in accordance with the ultrasonic flow meter system of the invention.
Figure 5:
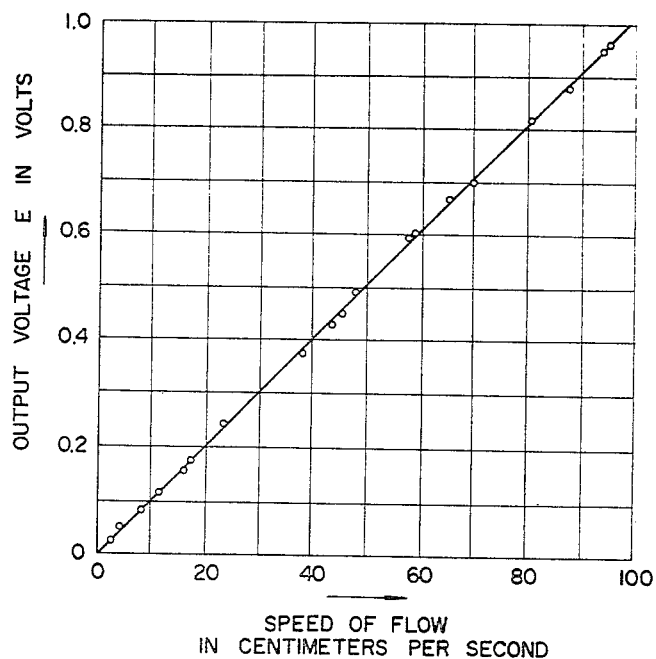
Figure 2:
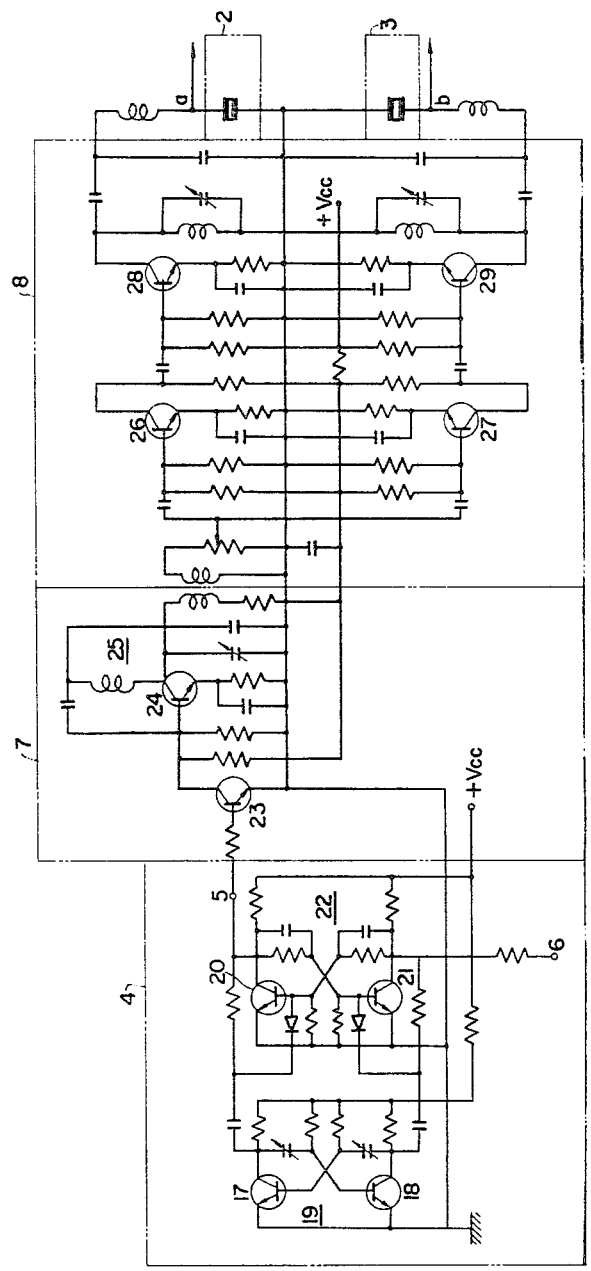
FIGURES 2 and 3 are each a schematic diagram of an electric circuitry suitable for use in the ultrasonic flow meter system illustrated in FIGURE 1.
Figure 3:
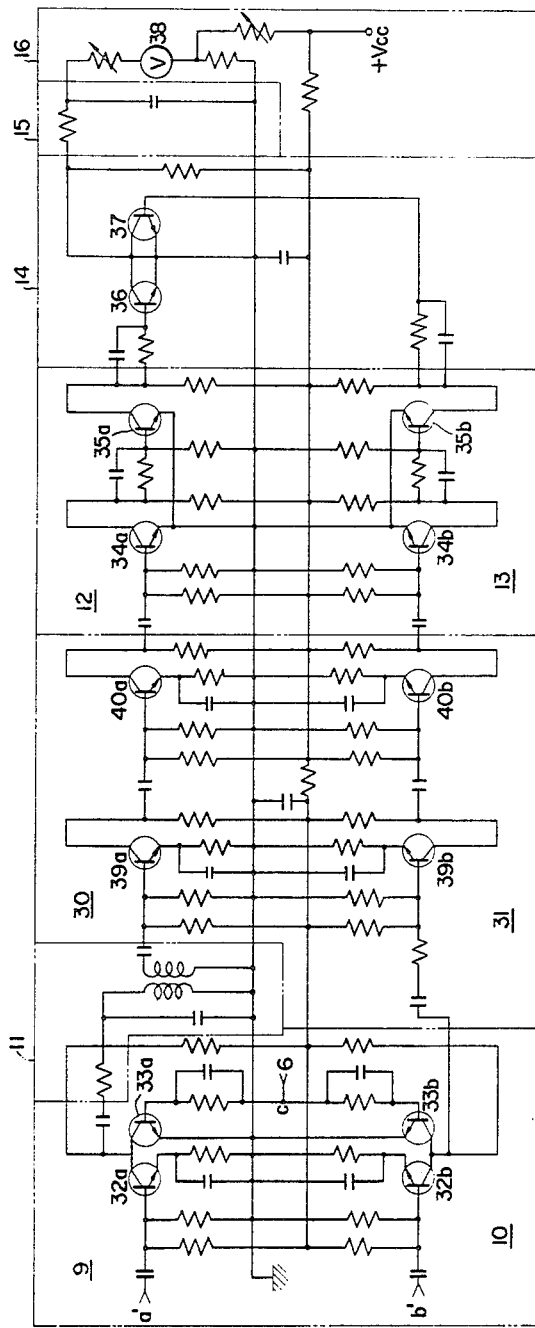

FIGURES 4a through h are views illustrating output waveforms from the various portions of the circuitry shown in FIGURES 2 and 3; and FIGURE 5 is the operating characteristic curve of the ultrasonic flow meter system illustrated in FIGURES 1 through 3.

Throughout several figures the same reference numerals designate the like or corresponding parts.

The invention is based upon the fact that an interval of time during which an ultrasonic wave traverses obliquely a flow of fluid is a function of a speed at which the fluid is flowing.

Referring now to the drawings and FIGURE 1 in particular, there is illustrated an ultrasonic flow meter system constructed in accordance with the teachings of the invention. An arrangement illustrated comprises a duct 1 through which a fluid to be measured is caused to flow, and a first and a second transducers 2 and 3 respectively disposed on the peripheral wall of the duct 1 in which positions that they are located on a straight line passing through and inclined at a predetermined angle to the longitudinal axis of the duct. Each transducer serves to convert an electrical energy applied thereto to an ultrasonic energy and transmit it in the form of a beam along said straight line through the flow of fluid toward the other transducer and to receive another beam of ultrasonic wave transmitted by the other transducer and having traversed the flow of fluid and convert it to an electrical energy.

The arrangement further comprises a synchronizing pulse generator 4 having a pair of output terminals 5 and 6 and a high frequency oscillator 7 controlled by the synchronizing pulse generator 4 to produce an oscillatory energy at a predetermined high frequency. The oscillator 7 is arranged to receive a pulse of one polarity appearing at the output terminal 5 of the sync. generator 4 to be put in its operative state during reception of such a pulse. The oscillatory energy from the oscillator 7 may be applied to a transmitter amplifier 8. Then the energy is simultaneously applied to both the transducers 2 and 3 each of which, in turn, transmits a beam of ultrasonic wave toward the other transducer through the flow of fluid through the duct 1.

The synchronizing pulse generator 4 is connected at the other terminal 6 to a first and a second receiver amplifiers 9 and 10 to control their operation. The amplifiers 9 and 10 are adapted to amplify electrical energies converted by the transducers 2 and 3 respectively when they have the synchronizing pulse of the other polarity applied by the other output terminal 6 of the generator 4. The first receiver amplifier 9 is connected to a phase shifter 11 for the purpose as will be described hereinafter. Then the phase shifter 11 is connected to a first Schmitt circuit 12 for shaping the phase shifted energy from the phase shifter 11 into a rectangular waveform. Similarly, the second receiver amplifier 10 is connected directly to a second Schmitt circuit 13 operative in the same manner as the first Schmitt circuit 12. If desired, the circuits 12 and 13 may be of any suitable type other than Schmitt type.

The output waveforms from the first and second Schmitt circuits 12 and 13 respectively are applied to a phase comparison circuit 14 where the waveforms are compared in phase to provide a rectangular waveforms having a pulse width proportional to a difference between phases of the Schmitt outputs. The output waveform from the circuit 14 is integrated by an integrator 15 and applied to a recorder or an indicator 16 for recording or indicating a magnitude of integrated direct current voltage providing a measure of a speed of the fluid flowing through the duct 1.

Referring now to FIGURES 2 and 3, there is illustrated an electric circuitry particularly suitable for use in the ultrasonic flowmeter system as above described in conjunction with FIGURE 1.

As shown in FIGURE 2 wherein a transmitter unit of the ultrasonic flowmeter system is illustrated, the synchronizing pulse generator 4 includes a pair of P type transistors 17 and 18 connected so as to form an astable multivibrator of the conventional construction generally designated by the reference numeral 19 and a pair of P type transistors 20 and 21 connected so as to form a flip-flop of the conventional construction generally designated by the reference numeral 22. The multivibrator 19 is designated to provide synchronizing pulses having a frequency of from 2 to 8 kilocycles per second for the purpose as will be apparent hereinafter and the flip-flop 22 is adapted to receive the synchronizing pulses from the multivibrator 19 to provide the rectangular waveforms of alternate polarity at its output terminals 5 and 6.

The ultrasonic oscillator 7 includes a P type switching transistor 23 having its base electrode connected to the output terminal 5 of the flip-flop 22 through a resistor, and a P type oscillation transistor 24 forming a part of an LC Colpitts oscillation circuit generally designated by the reference numeral 25. If desired, the oscillation circuit may be of any suitable type other than the Colpitts type. The oscillator 7 preferably oscillates at a high frequency of from 2 to 5 megacycles per second for a predetermined period of time at predetermined intervals of time as determined by the sync. generator 4.

The transmitter amplifier may be of the conventional type and in this example is shown as comprising a balanced two stage amplifier of resonance type including a pair of P type transistors 26 and 28 and a pair of P type transistors 27 and 29. The outputs of the balanced amplifier 8 are connected across the serially connected transducers 2 and 3 at the input terminals $a$ and $b$ with the neutral or ground line of the amplifier connected to the junction of both transducers. With the arrangement illustrated, it is to be noted that both transducers 2 and 3 have the electrical energies substantially in phase applied thereto.

The transducers 2 and 3 having substantially the identical construction and characteristics may be of any desired type capable of converting an electrical energy to an ultrasonic energy and vice versa and in the example illustrated it is assumed that they are made of ceramic lead zirconium titanate and therefore of the electrostriction type.

FIGURE 3 illustrates the remaining circuits or the receiver and recorder unit of the present flow meter system. In FIGURE 3 it is noted that a third and a fourth receiver amplifiers 30 and 31 are connected between the phase shifter 11 and the first Schmitt circuit 12 and between the second receiver amplifier 10 and the second Schmitt circuit 13 respectively for the purpose of providing a high gain receiver unit. However such amplifiers 30 and 31 have been omitted in FIGURE 1 for purposes of simplification.

As shown at the arrows $a'$ and $b'$ in FIGURE 3, the terminals $a$ and $b$ common to the inputs and the outputs respectively of the transducers 2 and 3 are connected to the inputs to the first and second receiver amplifiers 9 and 10 respectively. Each amplifier 9 or 10 may be of any suitable type and in this case includes a P type transistor $32a$ or $32b$ having its base electrode operatively coupled to the input of the amplifier and a P type switching transistor $33a$ or $33b$ whose collector electrode is connected to the collector electrode of the transistor $32a$ or $32b$. The transistors $33a$ and $33b$ have the respective base electrodes connected together to a point $c$ through parallel combinations of a resistor and a capacitor, which point is connected to the output terminal 6 of the synchronizing pulse generator 4. It will be appreciated that the first and second receiver amplifiers 9 and 10 have substantially the same characteristics and form a balanced amplifier.

The output of the first receiver amplifier 9 is connected to the input to the third receiver amplifier 30 through the phase shifter 11 shown as being of an LC type while the output of the second receiver amplifier 10 is connected directly to the input to the fourth receiver amplifier 31. The third and fourth receiver amplifiers 30 and 31 may be of any suitable type and each is shown as including a two stage including P type transistors $39a$ and $40a$ or $39b$ and $40b$ connected in the conventional manner. The third and fourth amplifiers 30 and 31 also are identical in characteristics to each other and form a balanced amplifier.

The third and fourth amplifiers 30 and 31 apply their outputs to the first and second Schmitt circuits 12 and 13 substantially identical in construction and characteristics to each other, each including a pair of P type transistors $34a$ and $35a$ or $34b$ and $35b$. The outputs of the first and second Schmitt circuits 12 and 13 are operatively coupled to base electrodes of two P type transistors 36 and 37 disposed in parallel to form the phase comparison circuit 14 of "NOR" gate type the output of which is electrically connected to a voltmeter 38 as an indicator through the integrator 15 composed of a resistor and a capacitor.

In FIGURES 2 and 3 the reference characters $+Vcc$ designate a positive terminal of a source of electric power for energizing the circuitry.

The operation of the circuitry illustrated in FIGURES 2 and 3 will now be described with reference to FIGURE 4 wherein various waveforms appearing at the different points of the circuitry as above described and wherein the abscissa represents time and the coordinate represents a magnitude of voltage relative to a reference voltage represented by the horizontal line labelled 0.

In operation the astable multivibrator 19 of the transmitter unit generates pulses having a predetermined pulse recurrence frequency in the order of several thousand cycles per second and preferably ranging from 2 to 8 kilocycles per second and applies two series of the pulses opposite in polarity to the two inputs to the flip-flop 22 respectively. Then the flip-flop 22 provides at their output terminals 5 and 6 a pair of rectangular waveforms as shown in FIGURES $4a$ and $4b$ respectively. One of the outputs appearing at the output terminal 5 has zero value for each period of time of $t_1-t_2$, $t_3-t_4$, . . . dependent upon the pulse recurrence frequency involved and a positive value for each period of time of $t_2-t_3$, $t_4-t_5$, . . . also dependent upon the pulse recurrence frequency while the other output appearing at the output terminal 6 has a positive value for each period of time of $t_1-t_2$, $t_3-t_4$ . . . and zero value for each period of time of $t_2-t_3$, $t_4-t_5$, . . .

In other words, the one output as to its configuration is a mirror image of the other output with respect to the time axis. For purpose of explanation, that portion of each output having the positive value is called an output of one polarity and that portion thereof having the zero value is called an output of other polarity.

The output waveform appearing at the output terminal 5 of the flip-flop 22 during the period of time $t_1-t_2$ is applied to the base electrode of the switching transistor 23 in the oscillator 7. When the transistor 23 has the output of one polarity applied to its base, the same is rendered conducting whereas the output of the other polarity applied to the transistor 23 causes the latter to be non-conducting.

With the transistor 23 maintained in its non-conducting state, the LC Colpitts oscillator 23 and therefore the oscillator 7 oscillates at a predetermined frequency preferably ranging from 2 to 5 megacycles per second. The oscillatory energy produced by the oscillator 7 is amplified by the transmitter amplifier 8 which, in turn, supplies across both transducers 2 and 3 the amplified oscillatory energies as shown between times $t_1$ and $t_2$ in FIGURES 4a and d respectively. Then each transducer 2 or 3 converts the received electrical energy to an energy of ultrasonic wave and transmits a beam of ultrasonic wave toward the other transducer through a fluid flowing through the duct 1.

During the succeeding period of time of $t_2$–$t_3$, the output of one polarity will appear at the output terminal 5 of the flip-flop 22 and when applied to the switching transistor 23 brings it into its conducting state. Conduction of the transistor 23 causes the base electrode of the oscillation transistor 25 to be connected to the ground resulting in the Colpitts oscillator 25 and hence the oscillator 7 ceasing to oscillate. As a result, each of the transducers 2 and 3 has no electrical energy applied thereto and accordingly transmits no beam of ultrasonic wave through the flow of fluid. Thus each transducer is ready for the next reception of the ultrasonic wave having transmitted by the other transducer during the preceeding transmission period of time.

Then the process as above described is repeated and thereby the first and second transducers 2 and 3 intermittently transmit the beams of ultrasonic wave for alternate periods of time controlled by the synchronizing pulse generator 4 or 19 and 22.

It will be readily understood that for the transmission periods of time when the oscillator 7 is in its oscillating state to permit the transducers 2 and 3 to transmit the beams of ultrasonic wave through the flow of fluid, that is to say, when the synchronizing pulse generator 4 is providing the synchronizing or controlling pulse of the other polarity at the terminal 5 that the generator 4 is also providing the synchronizing pulse of said one polarity at the other terminal 6 as shown in FIGURES 4a and b. During such periods of time the electrical energy applied across each transducer 2 or 3 at the terminal $a$ or $b$ and the common terminal, will also be supplied to the input $a'$ or $b'$ (see FIGURE 3) to each of the receiver amplifiers 9 or 10 and hence to the base electrode of each transistor 32a or 32b thereof. However the pulse having the one polarity or the positive valve is simultaneously to the circuit point or the junction $c$ between the base resistors for the switching transistors 33a and $b$ connected in parallel to the input transistors 32a and 32b respectively. This causes the transistors 33a and $b$ to be in their conducting state thereby to bypass the outputs from the transistors 32a and $b$ to the ground. Thus the energies supplied by the transmitter amplifier 8 and reaching the receiving amplifiers 9 and 10 through the terminals $a$ and $b$ of the transducers 2 and 3 are prevented from appearing at the inputs to the succeeding stages.

Then the period of time such as $t_1$–$t_2$ during which the transducers 2 and 3 are transmitting the beams of ultrasonic waves terminates and the succeeding period of time such as $t_2$–$t_3$ starts. At the end of the period of time of $t_1$–$t_2$ the synchronizing pulses at the output terminals 5 and 6 of the generator 4 or the flip-flop 22 are reversed in polarity whereupon the transducers 2 and 3 switch from their mode of transmitting operation to their mode of receiving operation due to termination of the operation of the oscillator 4 while at the same time the switching transmitters 33a and $b$ of the first and second receiver amplifiers 9 and 10 to put them into their operative state.

Under these circumstances, each of the transducers 2 or 3 can receive the beam of ultrasonic wave transmitted by the other transducer and traveling through the flow of fluid through the duct 1.

Referring back to FIGURE 1, the transducers 2 and 3 are disposed on the peripheral wall of the duct 1 and on a straight line passing through and inclined at a predetermined angle of $\alpha$ to the longitudinal axis of the duct 1.

Thus it will be appreciated that the beam of ultrasonic wave transmitted by each transducer 2 or 3 travels substantially along the straight line through the flow of fluid through the duct 1 until it reaches the other transducer. It is now assumed that $l$ represents a length of path through which the beam of ultrasonic wave transmitted by each transducer passes through the flow of fluid to the other transducer, C represents the velocity of ultrasonic wave within the fluid and V represents a speed at which the fluid flows through the duct 1 in the direction of the arrow. Under the assumed conditions, for the ultrasonic wave transmitted from the first transducer 2 downstream to the second transducer 3, the second transducer 3 will receive the ultrasonic wave form after a time lapse $T_1$ expressed by the equation (1) $\qquad T_1 = l/(C+V \cos \alpha)$ measured at the instant that wave has been transmitted by the first transducer 2. Similarly the ultrasonic waveform upstream transmitted by the second transducer 3 will have a time lapse $T_2$ expressed by the equation (2) $\qquad T_2 = l/(C-V \cos \alpha)$ Thus it will be appreciated that the ultrasonic wave received by the first transducer 2 has its time of propagation longer than that received by the second transducer 3 by a magnitude $T_3 = T_2 - T_1$ approximately expressed by the equation (3) $\qquad T_3 \doteq 2Vl/\cos \alpha /C^2$ Since the transducers 2 and 3 each have the transmission periods alternating the reception periods each of them is arranged to receive, during each reception period, substantially all the ultrasonic energy transmitted by the other transducer during the immediate preceeding transmission period thereby to prevent that portion of the ultrasonic energy transmission by one of the transducers during that transmission period from reaching the other transducer during the next succeeding transmission period. Assuming also that $C \gg V$, a time of propagation during which the beam of ultrasonic wave has traveled the above-mentioned length $l$ is equal to $l/C$. Thus the time of propagation varies with the length. Therefore, the sync. generator 4 is preset to have a pulse recurrence frequency substantially corresponding to that time of propagation of T to provide the transmission period equal to the reception period.

The ultrasonic waves received by the transducers 2 and 3 are converted to the corresponding electrical signals as illustrated in FIGURES 4e and f. It will be readily understood that these electrical energies are out of phase with a difference in phase angle corresponding to the magnitude approximately expressed by the above Equation 3. The converted electrical energies are applied to the first and second receiver amplifiers 9 and 10 now in their operative state under the control of the sync. generator 4 and the energy applied by the amplifier 9 to the phase shifter 11. The phase shifter 11 is preset to cause the electrical energy at one of both input to the phase comparator circuit 14 to be out of phase of substantially 180 degrees with respect to that at the other input provided that the electrical energies simultaneously appearing from both transducers 2 and 3 are substantially in phase. This is accomplished by adjustment of a capacitor in the phase shifter. The output from the phase shifter 11 and the output from the amplifier 10 are further amplified by the third and fourth receiver amplifiers 30 and 31 respectively.

The outputs from the third and fourth receiver amplifiers 30 and 31 are applied to the first and second Schmitt circuits 12 and 13 where they are shaped into rectangular waveforms as illustrated in FIGURES 4g and h. It wil be appreciated that the rectangular waveforms provided by the first and second Schmitt circuits 12 and 13 have the relative phase angles substantially equal to those of the output energies from the first and second transducers 2 and 3.

The rectangular waveforms from the Schmitt circuits 12 and 13 are applied to the phase comparison circuit 14 comprising a pair of P type transistors 36 and 37 connected in parallel circuit relationship. More specifically the rectangular waveform from the Schmitt circuit 12 originating from the first transducer 2 is applied to the base electrode of the transistor 36 while the rectangular waveform from the Schmitt circuit 13 is applied to the base electrode of the transistor 37.

As previously pointed out, the phase comparison circuit is a "NOR" gate and when two inputs thereof are at zero level both transistors 36 and 37 are non-conducting to provide an output maintained at Vcc. When one of the inputs is at a positive level the transistor associated with the one input becomes conducting to provide an output at zero level. With both inputs at a positive level, the output is at zero level. If it is assumed that the waveform from the Schmitt circuit 13 is first applied to the base electrode of the transistor 37, then after a time lapse corresponding to the difference between phase angles of both rectangular waveforms $g$ and $h$ or the interval of time approximately expressed by the Equation 3, the rectangular waveform from the second Schmitt circuit 12 originating from the second transducer 2 is applied to the base electrode of the transistor 36. Therefore, the circuit 14 provides an output at a positive level only when both inputs are simultaneously at zero level. Thus, the phase comparison circuit 14 provides undirectional pulses of rectangular waveform having a pulse width proportional to the phase difference between rectangular waveforms from the Schmitt circuits 12 and 13. These pulses are shown in FIGURE 4i.

The pulses supplied by the phase comparison circuit 14 is integrated by the RC integrator 15 which, in turn, applies to the indicator such as the voltmeter 38 a direct current voltage as illustrated in FIGURE 4j. This direct current voltage is proportional to the speed of the fluid flowing through the duct 1 and provides a measure of a flow rate of the fluid. If desired, any suitable recorder in place of the voltameter 38 or with the latter may be used to record the magnitude of the voltage supplied by the integrator 15.

The operation of the receiver unit as above described in conjunction with FIGURES 3 and 4 are performed for the reception periods such as the periods of $t_2$–$t_3$, $t_4$–$t_5$, . . . shown in FIGURE 4. The reception periods alternate the transmission period as previously described in conjunction with FIGURES 2 and 4 to provide on the voltmeter 38 a continuous indication as a measure of the speed of the fluid flowing through the duct.

As previously described, the synchronizing pulse produced by the sync. generator 4 has its frequency ranging from 2 to 8 kilocycles per second. Therefore switching of the transmission to the reception period is effected once during the interval of time corresponding to such a frequency. Also the ultrasonic waves transmitted and received by the first and second transducers 2 and 3 has a common frequency ranging from 2 to 5 megacycles per second. Under these circumstances, each of the transducers 2 and 3 can receive the number in the order of $10^3$ of ultrasonic pulses during each reception period of time of $t_2$–$t_3$, $t_4$–$t_5$, . . . or a half the interval of time corresponding to the switching frequency determined by the sync. generator. Thus the number in order of $10^3$ of the rectangular waveforms are subject to phase comparison.

As an example, a flow meter including the circuitry such as illustrated in FIGURES 2 and 3 was made and tested with clear water. Clear water at approximately 20° C. flowed at a varying speed into a reservoir through a duct such as the duct 1 shown in FIGURE 1 having an inside diameter of 70 millimeters connected to the reservoir. The duct was provided on the peripheral wall with a pair of lead zirconium titanate transducers such as the transducers 2 and 3 shown in FIGURE 1 in such position that they could transmit and receive ultrasonic waves having a frequency of approximately 4.2 megacycles per second and traveling through the flow of water in the form of a beam inclined at an angle of 30 degrees to the longitudinal axis of the duct. The actual speed of water flowing through the duct was obtained from the measured incremental volume of water per unit time within the reservoir and splotted against the magnitude of output indicated on the voltmeter 38 or the indicator 16. The results of experiment just described are illustrated in FIGURE 5.

As shown in FIGURE 5, the output E in volts indicated on the voltmeter 38 was varied substantially linearly to the speed V of water flowing through the duct with a degree of linearity being as high as within ±1% of a reading at the full scale over a range of from 0 to 1 meter per second. It has been also found that the present flow meter had a response time of less than 0.1 millisecond.

A time of propagation of an ultrasonic wave traveling a fluid and hence a phase difference between electrical energies appearing at the respective outputs of the transducers 2 and 3 is inevitably affected by a change in temperature of the fluid. In order to minimize or substantially eliminate this effect of fluid's temperature upon the phase difference, any suitable thermally sensitive element such as a thermistor may be disposed on the peripheral wall of the duct 1 adjacent one of both transducers for example the transducer 2 to sense a temperature of a fluid flowing through the duct. Then a direct current output from the thermistor will be applied to the indicator or recorder 16 together with the output from the integrator 15 thereby to compensate analogically for a change in fluid's temperature. If water is to be measured a thermistor having a negative coefficient of temperature can be used. To measure oils, thermistors having a positive coefficient of temperature can be used.

The invention has several advantages. For example, the present flow meter is simple in construction and yet extremely high in accuracy of measurement with a quick response time. Further it can not be affected by a change in temperature of the fluid.

What we claim is:

1. An ultrasonic flowmeter system for measuring a speed of a fluid flowing through duct means, comprising a first and a second electro-acoustical transducer element operatively coupled to said duct means, oscillator means for producing a high frequency energy, synchronizing pulse generator means for controlling the operation of said high frequency oscillator means to permit the high frequency oscillator means to produce and simultaneously apply said high frequency energy across said duct along on oblique path simultaneously to both first and second transducer elements for a predetermined period of time at predetermined intervals of time, each of said transducer elements being operative to convert said high frequency energy to an ultrasonic energy and transmit its beam toward the other transducer element through the fluid flowing through said duct means when said oscillator means are in an operative state and operative to receive the beam of ultrasonic wave transmitted by the other transducer element and convert it to an electrical energy during intervals said oscillator means are in an inoperative state, a first and second amplifier means connected to said first and second transducer elements and controlled by said synchronizing pulse generator means to be effective for amplifying the electrical energies converted by said first and second transducer elements when said high frequency oscillator means are in an inoperative state, phase shifter means electrically connected to said first amplifier means to shift the phase of the output from said first amplifier means to a predetermined magnitude, first Schmitt circuit means electrically connected to said said phase shifter means to shape the output from the first amplifier means to a rectangular waveform, second Schmitt circuit means electrically connected to said second amplifier means to shape the output from the second amplifier means to a rectangular waveform, and phase comparison circuit means electrically connected to said first and second Schmitt circuit means to detect a phase different between said rectangular waveforms, said phase difference providing a measure of a speed at which the fluid flows through the duct.

2. An ultrasonic flowmeter system as claimed in claim 1, wherein indicator means are electrically connected to said phase comparison circuit means to indicate the output from said phase comparison circuit means.

3. An ultrasonic flowmeter system as claimed in claim 1, wherein recorder means are electrically connected to said phase comparison circuit means to record the output from the phase comparison circuit means.

4. An ultrasonic flowmeter system as claimed in claim 1, wherein said high frequency oscillator means comprise means to produce an oscillatory energy whose frequency ranges from 2 to 5 megacycles per second and the synchronizing pulse generator means has a frequency ranging from 2 to 8 kilocycles per second.

5. An ultrasonic flowmeter system according to claim 1, in which said transducer elements are spaced axially on said duct on opposite sides thereof.

References Cited

UNITED STATES PATENTS

| 2,991,650 | 7/1961 | Katzenstein et al. | 73—194 |
| 3,258,961 | 7/1966 | Van Manen | 73—136 |

FOREIGN PATENTS

| 146,517 | 1962 | U.S.S.R. |

OTHER REFERENCES

W. R. Farrall: IRE Transaction on Medical Electronics, December 1959, pp. 198–201, copy in 73–194.

CHARLES A. RUEHL, Primary Examiner